(12) United States Patent
Parton

(10) Patent No.: US 11,293,155 B2
(45) Date of Patent: Apr. 5, 2022

(54) LANDFILL COMPACTOR

(71) Applicant: Maximum Density LLC, Boise, ID (US)

(72) Inventor: Paul O. Parton, Las Vegas, NV (US)

(73) Assignee: MAXIMUM DENSITY LLC, Boise, ID (US)

(*) Notice: Subject to any disclaimer, the term of this patent is extended or adjusted under 35 U.S.C. 154(b) by 120 days.

(21) Appl. No.: 16/596,334

(22) Filed: Oct. 8, 2019

(65) Prior Publication Data

US 2020/0115871 A1   Apr. 16, 2020

Related U.S. Application Data

(60) Provisional application No. 62/743,822, filed on Oct. 10, 2018.

(51) Int. Cl.
*B02C 13/06* (2006.01)
*E02D 3/026* (2006.01)
*B62D 65/00* (2006.01)
*B02C 21/02* (2006.01)

(52) U.S. Cl.
CPC ............. *E02D 3/026* (2013.01); *B02C 13/06* (2013.01); *B02C 21/026* (2013.01); *B62D 65/00* (2013.01); *B02C 2021/023* (2013.01); *B02C 2201/06* (2013.01)

(58) Field of Classification Search
CPC . B02C 21/026; B02C 2021/023; B02C 13/06; E02D 3/026
See application file for complete search history.

(56) References Cited

U.S. PATENT DOCUMENTS

| | | | |
|---|---|---|---|
| 5,683,042 A | 11/1997 | Giovanardi | |
| 5,826,808 A | 10/1998 | Giovanardi | |
| 6,558,080 B2 | 5/2003 | Kozak | |
| 7,278,596 B2* | 10/2007 | Moriya | B02C 13/095 241/189.1 |
| 9,016,710 B2* | 4/2015 | Wagner | E01C 19/26 280/468 |
| 9,186,681 B2* | 11/2015 | Cohen | B02C 23/02 |
| 2012/0045281 A1* | 2/2012 | Wagner | E01C 19/282 404/117 |
| 2013/0115001 A1* | 5/2013 | Von Vett | E02D 3/026 404/129 |
| 2013/0202366 A1* | 8/2013 | Maas | A01B 45/026 405/271 |

(Continued)

FOREIGN PATENT DOCUMENTS

| | | |
|---|---|---|
| DE | 102016009029 A1 | 2/2018 |
| WO | WO2005063398 A1 | 7/2005 |

OTHER PUBLICATIONS

US Patent and Trademark Office; International Search Report & Written Opinion; PCT/US2019/055340; dated Jan. 2, 2020.

*Primary Examiner* — Faye Francis
(74) *Attorney, Agent, or Firm* — Parsons Behle & Latimer

(57) ABSTRACT

Disclosed embodiments include diesel-electric powered, substantially heavier (e.g., 120 ton), larger (e.g., 11' 8" and 12' 6" diameter wheels), and more powerful (e.g., 250-350 hp per wheel) landfill compactors. Disclosed embodiments also include an integral hammer mill, oriented in an "upside-down" configuration to additionally compact landfill waste.

20 Claims, 1 Drawing Sheet

(56) References Cited

U.S. PATENT DOCUMENTS

| | | | |
|---|---|---|---|
| 2013/0221143 A1* | 8/2013 | Davis | B02C 21/02 |
| | | | 241/101.71 |
| 2016/0176278 A1 | 6/2016 | Bletscher et al. | |
| 2017/0284036 A1 | 10/2017 | Rio | |
| 2018/0126891 A1* | 5/2018 | Berning | B60P 3/062 |
| 2019/0126283 A1* | 5/2019 | Weinberg | A01B 41/04 |
| 2019/0291120 A1* | 9/2019 | Lindner | B02C 25/00 |
| 2019/0336980 A1* | 11/2019 | Ragnarsson | B02C 23/04 |
| 2020/0316611 A1* | 10/2020 | Lindner | B02C 18/14 |
| 2021/0079837 A1* | 3/2021 | Crankshaw | B60K 6/20 |

* cited by examiner

LANDFILL COMPACTOR

CROSS-REFERENCE TO RELATED APPLICATIONS

This application, under 35 U.S.C. § 119, claims the benefit of U.S. Provisional Patent Application Ser. No. 62/743,822 filed on Oct. 10, 2018, and entitled "Landfill Compactor," the contents of which are hereby incorporated by reference herein.

FIELD OF THE DISCLOSURE

This disclosure relates generally to landfill compactors. In particular, this disclosure relates to improvements to landfill compactors to enable, among other things, larger wheels, heavier vehicle weights, and, thus, improved compacting force, as well as improved hammer mill mounting and operation.

BACKGROUND

The common and acceptable drive force for most current landfill compactors is hydraulic drive, or some form of hydrostatic drive. For example, hydraulic or hydrostatic drives are used on current machines made by Caterpillar, Komatsu, BoMag, AlJon, CMI, Pac Mor, and others. Typically, the common drive in these machines is a diesel engine with multiple hydraulic pumps attached to the engine through a multi-geared transmission assembly to drive the unit with hydraulic motors.

One limitation on hydraulically driven machines is that they have reached the upper limit of the hydraulic motors. This limits the amount of torque available to turn the wheels. That translates to a small wheel diameter and a finite limit in the machine weight. The upper maximum weight of the largest machine currently sold, the AlJon, is 64 U.S. tons. The weight limit therefore is restrictive in the compacting force that can be applied to the solid waste. In order to maximize the density of the waste, the machines must track over the same area as many as four or six times.

Existing machines, due to these limitations, can typically only exert a maximum of 16 tons compacting force on each wheel. Existing machines also have a torque limitation, so they all typically have wheels that are approximately six feet in diameter. This stature keeps the machine body, in effect, swimming in the waste causing other problems in maintenance, serviceability, operability, and the like.

Further, in most existing machines, the maximum horsepower is approximately 600 hp. After accounting for parasitic loads (e.g., alternators, cooling fans, steering pump, air conditioning, etc.) there is usually a maximum available 130 horsepower at each wheel. In practice, most existing machines will have only about 100 horsepower available at each corner.

Further, existing machines that include hammer mills, or grinders, typically are used in a specific configuration. Typically, existing machines use grinders in combination with screens that meter the waste throughput by hole sizes in the screening devices, or by sizing rods that limit the size of the waste passed through the machine. The very nature of the screens (or other size limiting devices) create a "wear-parts cost," and keep any metal contaminants found in the solid waste stream inside the hammer mill area until it is reduced in size. Keeping the metals inside the mill area causes increased wear on the hammers, screens and results in wasted energy.

Other drawbacks, issues, and inconveniences of existing machines also exist.

SUMMARY

Accordingly, disclosed embodiments address the above, and other, drawbacks, issues, and inconveniences of existing machines. Disclosed embodiments include diesel-electric powered, substantially heavier (e.g., 120 ton), larger (e.g., 12' 6" diameter wheels), and more powerful (e.g., 250-350 hp per wheel) landfill compactors. Disclosed embodiments also include an integral hammer mill, oriented in an "upside-down" configuration to additionally compact landfill waste. For example, using the hammer mill to "shred" the waste reduces voids (e.g., caused by volume items such as white goods such as refrigerators and appliances) thereby allowing the disclosed landfill compactor with its superior weight to better compact it.

Disclosed embodiments include a landfill compactor having a diesel-electric drive in electrical communication with at least one drive motor, at least one compactor wheel driven by the at least one drive motor, a mainframe structure that at least partially supports the diesel-electric drive, and an inverted hammer mill mounted to the mainframe structure and selectively pivotable about a pivot on the mainframe structure.

In some disclosed embodiments, the diesel-electric drive comprises a diesel engine-alternator module that delivers at least a 2400 hp. In still further disclosed embodiments, the diesel engine-alternator module may include two 1200 hp diesel engine-alternator modules.

In some disclosed embodiments, the at least one drive motor comprises an electric motor having at least 250 to 350 horsepower.

In some disclosed embodiments, the at least one compactor wheel comprises a wheel with at least a twelve foot, six inch (12' 6") diameter. In still further disclosed embodiments, the wheel comprises a wheel with at least an eleven foot, eight inch (11" 8") diameter.

In some disclosed embodiments, the at least one compactor wheel delivers a compacting force substantially equal to 30 tons.

In some disclosed embodiments, the inverted hammer mill comprises a housing.

In some disclosed embodiments, the inverted hammer mill is selectively adjustable in height with respect to the mainframe structure.

In some disclosed embodiments, the inverted hammer mill is driven by an electric traction motor.

Also disclosed are methods of manufacturing a landfill compactor. In some embodiments the method includes providing a diesel-electric drive in electrical communication with at least one drive motor, providing at least one compactor wheel driven by the at least one drive motor, providing a mainframe structure that at least partially supports the diesel-electric drive, and providing an inverted hammer mill mounted to the mainframe structure and selectively pivotable about a pivot on the mainframe structure.

In some disclosed embodiments, the step of providing a diesel-electric drive comprises providing a diesel engine-alternator module that delivers at least a 2400 hp. In still further disclosed embodiments, the step of providing a diesel electric drive comprises providing two 1200 hp diesel engine-alternator modules.

In some disclosed embodiments, the step of providing at least one drive motor comprises providing an electric motor having at least 250 to 350 horsepower.

In some disclosed embodiments, the step of providing at least one compactor wheel comprises providing a wheel with at least a twelve foot, six inch (12' 6") diameter. In still further disclosed embodiments, the step of providing at least one compactor wheel comprises providing a wheel with at least an eleven foot, eight inch (11" 8") diameter.

In some disclosed embodiments, the step of providing at least one compactor wheel comprises providing a wheel that delivers a compacting force substantially equal to 30 tons.

In some disclosed embodiments, the step of providing an inverted hammer mill comprises providing a housing for the inverted hammer mill.

In some disclosed embodiments, the step of providing an inverted hammer mill comprises providing an inverted hammer mill that is selectively adjustable in height with respect to the mainframe structure.

In some disclosed embodiments, the step of providing an inverted hammer mill comprises providing an inverted hammer mill that is driven by an electric traction motor.

Other embodiments also exist.

Figure 1:
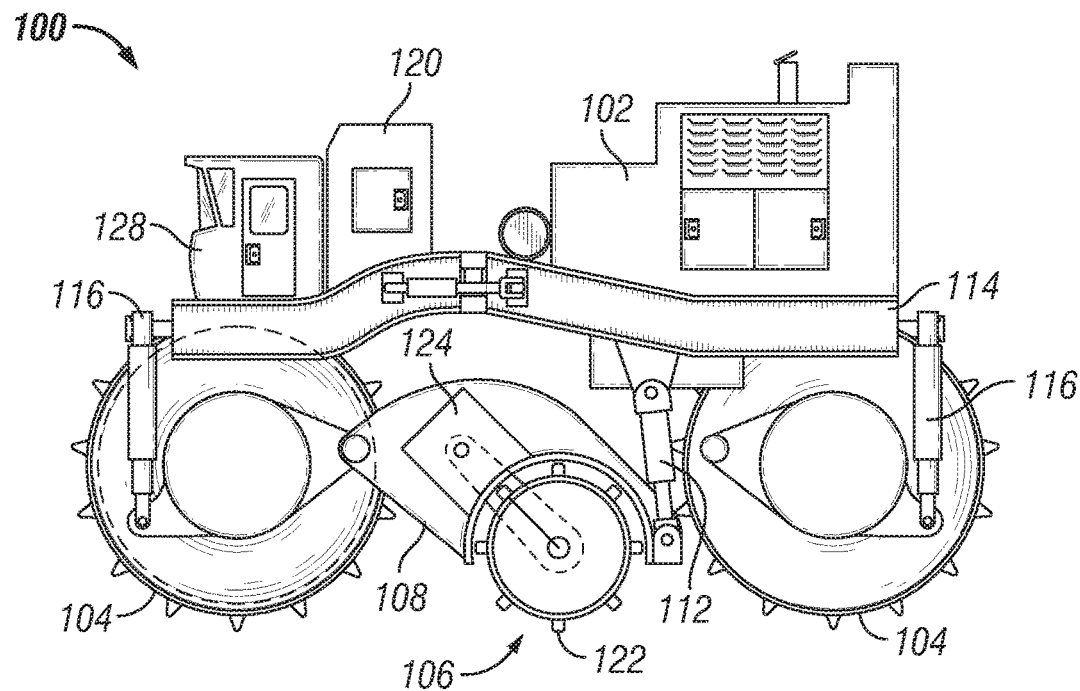
FIG. 1 is a side view schematic of a landfill compactor in accordance with disclosed embodiments.
Figure 2:
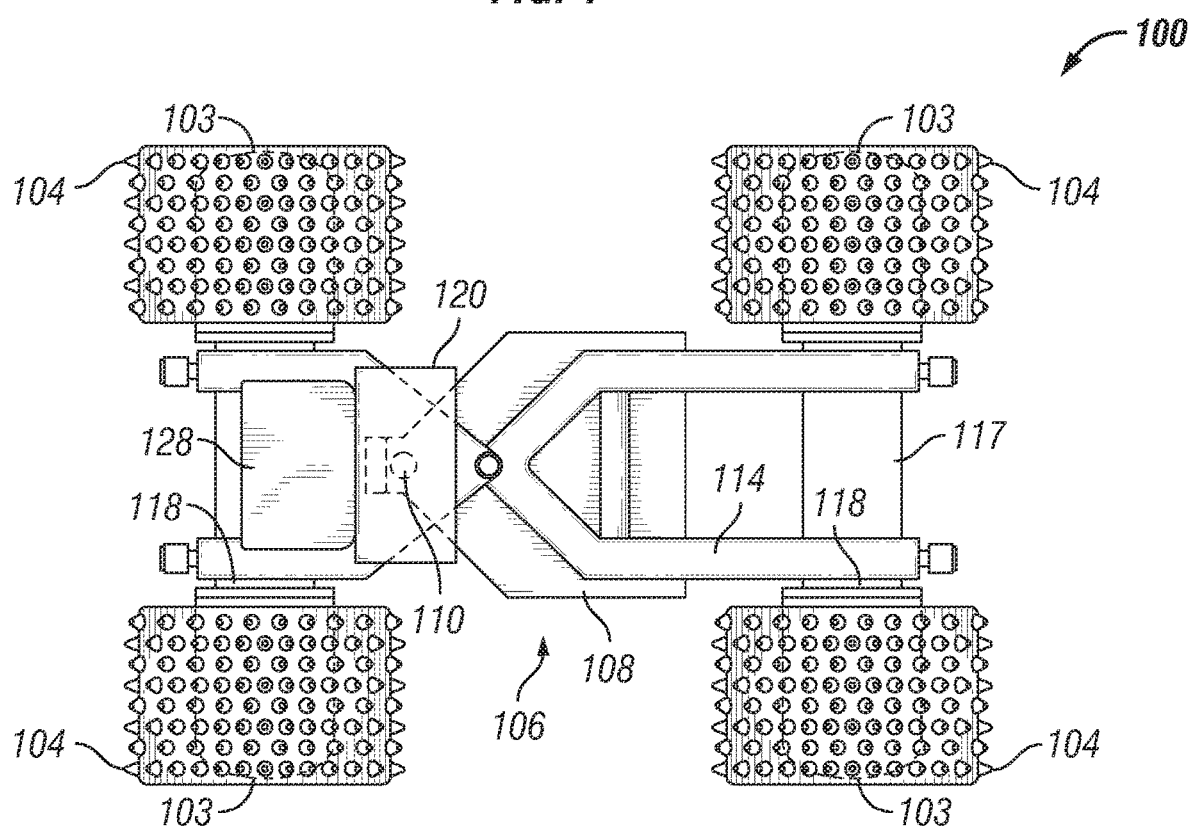
FIG. 2 is a top view schematic of a landfill compactor in accordance with disclosed embodiments.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION

Embodiments of a landfill compactor 100 in accordance with this disclosure use a diesel-electric drive 102. For example, and as illustrated in the figures, a 2400 hp diesel engine-alternator module may be used as a diesel-electric drive 102. This opens up several opportunities to improve on currently existing machines. First, as designed, disclosed embodiments of the landfill compactor 100 weigh approximately 120 tons. That overall weight translates to 30 tons compacting force at each wheel 104, nearly double as compared to the currently existing heaviest machines at 16 tons per wheel.

Second, the 2400 hp diesel engine-alternator module (e.g., diesel-electric drive 102) powers electric drive motors 103 that deliver at least 250 to 350 horsepower at each wheel 104. This is at least a 150% improvement over the horsepower of currently existing machines. In some embodiments, two engine-alternator modules (e.g., diesel electric drive 102) may be used. For example, one electric drive 102 for motive power (e.g. powering drive motor 103) and one electric drive 102 for powering the hammer mill 106. In such embodiments, the two drives 102 may deliver 1200 hp each (for a combined total of 2400 hp), or any number of combinations of drives 102 and horsepowers may be placed on the mainframe structure 114.

The increased horsepower-per-wheel allows at least an eleven foot, eight inch (11" 8") diameter wheel, and some embodiments may have a twelve foot, six inch (12' 6") diameter wheel 104 on embodiments of the landfill compactor 100. The increased diameter wheels 104, among other things, raise the landfill compactor 100 up out of the waste and keep it away from the above-described problems associated with smaller wheels.

In addition, the larger wheels 104 are heavier (weighing about 8 tons each (without water ballast)) and, given the overall landfill compactor 100 weight, exert a compacting force of substantially 30 tons per wheel and the operational benefit is that maximum density of compacted waste is typically reached in one or two passes at the most. Further, the disclosed heavier landfill compactor 100 achieves a greater overall compacted density by as much as 34%. Greater compacted density, among other things, leads to extended existing landfill life.

In presently disclosed embodiments of landfill compactors 100, a waste grinder, in the form of a hammer mill 106, is included, but with a unique design. Typically, A hammer mill is essentially a steel drum containing a vertical or horizontal rotating shaft or drum on which hammers are mounted. The hammers are free to swing on the ends of the crossbeam or are fixed to a central rotor. The rotor is spun at a high speed inside the drum while material is fed into a feed hopper. The material is impacted by the hammer bars and is thereby shredded and expelled through screens in the drum of a selected size. As shown in the figures, for embodiments of the landfill compactor 100 the mill 106 is oriented "upside-down" from conventional orientation. Among other things, upside-down orientation allows processing of the waste against itself and eliminates the need to feed material into a hopper. In presently disclosed embodiments, when the mill 106 encounters a metal or other waste that will not easily grind, the mill 106 drives the waste downward into the ground, or previously compacted material. One of ordinary skill in the art having the benefit of this disclosure will comprehend the many advantages of the upside-down orientation that will not be enumerated here, except for the following few benefits.

Orienting the mill 106 upside down, among other things, eliminates the need for screens and replaces them with a unique hammer mill housing 108 that enhances the opportunity for the waste to be ground up against itself. Additionally, the mill 106 is not "rolled" along the ground and waste, but rather is pivoted about a pivot 110, which is located on a central, longitudinal axis extending from the front (i.e., cab 128) to the rear end of the compactor 100, and lowered down (e.g., with adjustable height hydraulics 112 or the like) and the waste is "broken" in specific increments to make a rough approximation of a semi-circle (i.e., by pivoting of the mill 106 to the left and right of the central, longitudinal axis) which can then be driven over and compacted. Such operation, among other things, eliminates screens, screen tracks, and the resultant expensive wear-parts replacement costs.

Further, upside-down orientation does not trap metal or other difficult to grind contaminants. The elimination of large metal contaminants vastly increases hammer tip 122 life and time between hard-facing or replacement. Hammer mill 106 may be driven by an electric traction motor 124 or the like that is also powered by the diesel-electric drive 102.

The combination of a landfill compactor 100 carrying an integral hammer mill 106 is a unique application in itself. Typically, hammer mills are stationary units that have to be fed by another machine, then the waste pushed from the unit and then processed by a compactor. The presently disclosed embodiments provide those functions in one mobile landfill compactor 100.

Embodiments of the landfill compactor 100 may include other typically landfill-related tools such as a spread and push blades, buckets, backhoes, and the like (not shown in the figures).

Embodiments of the landfill compactor 100 include a mainframe structure 114 arranged generally along a central, longitudinal axis (not shown) extending from a front end (generally, cab 128) to a rear end (generally, wheels 104 and torque tube crossmember 117 located behind the cab 128). In some embodiments, the mainframe 114 may be similar to those used in 120 ton trucks. Likewise, landfill compactor 100 includes appropriate suspension 116, torque tube crossmembers 117, axles 118, and the like. Again, suspension 116, torque tube crossmembers 117, and axles 118 may be adapted from those used in 120 ton trucks, or the like.

Embodiments of the landfill compactor 100 include an electrical control box 120 for controlling and monitoring the various equipment and operations of the landfill compactor 100. Landfill compactor 100 also includes a cab 122 at the front end of the vehicle for an operator (or operators) to drive and operate the vehicle.

Although various embodiments have been shown and described, the present disclosure is not so limited and will be understood to include all such modifications and variations are would be apparent to one skilled in the art.

What is claimed is:

1. A landfill compactor comprising:
   a diesel-electric drive in electrical communication with at least one drive motor;
   at least one compactor wheel driven by the at least one drive motor;
   a mainframe structure that at least partially supports the diesel-electric drive, the mainframe structure further comprising a front end, a rear end, and a central longitudinal axis that extends between the front end and the rear end; and
   an inverted hammer mill mounted to the mainframe structure at a pivot on the central longitudinal axis and selectively pivotable to the left and right of the central longitudinal axis about the pivot on the mainframe structure.

2. The landfill compactor of claim 1 wherein the diesel-electric drive comprises a diesel engine-alternator module that delivers at least a 2400 hp.

3. The landfill compactor of claim 1 wherein the diesel-electric drive comprises two diesel engine-alternator modules that deliver at least a 1200 hp each.

4. The landfill compactor of claim 1 wherein the at least one drive motor comprises an electric motor having at least 250 to 350 horsepower.

5. The landfill compactor of claim 1 wherein the at least one compactor wheel comprises a wheel with at least an eleven foot, eight inch (11' 8") diameter.

6. The landfill compactor of claim 1 wherein the at least one compactor wheel comprises a wheel with at least a twelve foot, six inch (12' 6") diameter.

7. The landfill compactor of claim 1 wherein the at least one compactor wheel delivers a compacting force substantially equal to 30 tons.

8. The landfill compactor of claim 1 wherein the inverted hammer mill comprises a housing.

9. The landfill compactor of claim 1 wherein the inverted hammer mill is selectively adjustable in height with respect to the mainframe structure.

10. The landfill compactor of claim 1 wherein the inverted hammer mill is driven by an electric traction motor.

11. A method of manufacturing a landfill compactor, the method comprising:
    providing a diesel-electric drive in electrical communication with at least one drive motor;
    providing at least one compactor wheel driven by the at least one drive motor;
    providing a mainframe structure that at least partially supports the diesel-electric drive, the mainframe structure further comprising a front end, a rear end, and a central longitudinal axis that extends between the front end and the rear end; and
    providing an inverted hammer mill mounted to the mainframe structure at a pivot on the central longitudinal axis and selectively pivotable to the left and right of the central longitudinal axis about the pivot on the mainframe structure.

12. The method of claim 11 wherein the step of providing a diesel-electric drive comprises providing a diesel engine-alternator module that delivers at least a 2400 hp.

13. The method of claim 11 wherein the step of providing a diesel-electric drive comprises providing two diesel engine-alternator modules that deliver at least a 1200 hp each.

14. The method of claim 11 wherein the step of providing at least one drive motor comprises providing an electric motor having at least 250 to 350 horsepower.

15. The method of claim 11 wherein the step of providing at least one compactor wheel comprises providing a wheel with at least an eleven foot, eight inch (11' 8") diameter.

16. The method of claim 11 wherein the step of providing at least one compactor wheel comprises providing a wheel with at least a twelve foot, six inch (12' 6') diameter.

17. The method of claim 11 wherein the step of providing at least one compactor wheel comprises providing a wheel that delivers a compacting force substantially equal to 30 tons.

18. The method of claim 11 wherein the step of providing an inverted hammer mill comprises providing a housing for the inverted hammer mill.

19. The method of claim 11 wherein the step of providing an inverted hammer mill comprises providing an inverted hammer mill that is selectively adjustable in height with respect to the mainframe structure.

20. The method of claim 11 wherein the step of providing an inverted hammer mill comprises providing an inverted hammer mill that is driven by an electric traction motor.

* * * * *